Oct. 25, 1966  A. W. HODGSON  3,281,641
RECTIFIER APPARATUS

Filed March 22, 1963                              2 Sheets-Sheet 1

PRIOR ART

WITNESSES
Theodore F. Wrobel
James F. Young

INVENTOR
Alfred W. Hodgson
BY Clement J. Poznokas
ATTORNEY 3,281,641
RECTIFIER APPARATUS
Alfred W. Hodgson, Orchard Park, N.Y., assignor to Westinghouse Electric Corporation, Pittsburgh, Pa., a corporation of Pennsylvania
Filed Mar. 22, 1963, Ser. No. 267,093
6 Claims. (Cl. 321—8)

This invention relates to apparatus for converting alternating current (A.C.) to direct current (D.C.).

In some three-phase motor starters, it may be desirable to have a D.C. contactor magnet operated from a three-phase rectifier energized by $3\phi$ power supplied directly or through a transformer or transformers from the main power supplied to the starter. In the course of maintenance and testing, the main power circuit of the starter would be de-energized, making it necessary to supply the D.C. contactor magnet from another source. Since 115 v. single-phase power is most readily available, it is desirable that the D.C. magnet be capable of operating through rectifiers from an independent 115 v. single-phase source as well as from the 115 v. three-phase power available in the starter. However, a standard three-phase rectifier bridge produces a much higher average D.C. voltage for a given A.C. input voltage than a standard single-phase rectifier bridge, thus requiring the use of auxiliary transformers, dropping resistors, etc., to match the D.C. voltages obtained from single-phase and three-phase bridges. Also the standard three-phase bridge requires six rectifier arms, while the standard single-phase bridge has only four arms.

One object of the invention is directed to a novel rectifier circuit configuration for the conversion of three-phase A.C. to D.C.

Another object of the invention is to provide novel A.C.–D.C. rectifier apparatus which is selectively convertible to either single-phase or three-phase operation.

Another object of the invention is to provide novel A.C.–D.C. rectifier apparatus which is selectively convertible to either single-phase or three-phase operation, and which will produce substantially the same D.C. output voltage for either single-phase or three-phase input voltage of a given value.

Another object is to provide such apparatus which will draw substantially balanced current from the three-phase line when employed in the three-phase mode.

Yet another object of the invention contemplates A.C.–D.C. rectifier apparatus which is selectively convertible for either single or three phase input and employs the same number of rectifier arms in either mode.

Another object is to provide such apparatus employing the same number and rating of rectifier arms in either single or three phase mode, and wherein a minimum number of minimum rated rectifiers are required.

A further object of the invention is to provide rectifier apparatus employing a given number of unidirectional arms for converting three-phase A.C. of given voltage value to D.C. having substantially the same average voltage value as the D.C. provided by a single-phase full wave rectifier bridge employing the same number of unidirectional arms and connected to a single-phase A.C. source having the same given voltage as the three-phase A.C.

Another object of the invention is to provide apparatus for converting three-phase A.C. to uniformly spaced unidirectional waves having a 300° base and only three peaks, the middle peak being 60° and the end peaks being 120°.

Other and further objects and advantages of the invention will be apparent from the following description taken in conjunction with the drawings wherein preferred forms of the invention are illustrated.

Figure 1A:
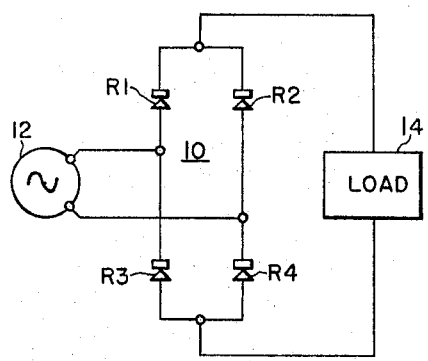
FIGURES 1A and 1B are respectively the diagram and the D.C. output wave form of the commonly known single-phase full wave bridge type rectifier circuit.
Figure 2A:
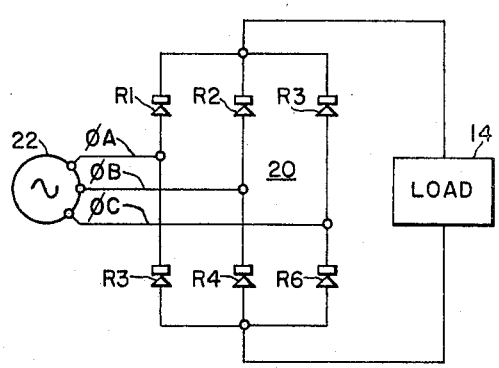
FIGS. 2A and 2B are respectively the diagram and the D.C. output wave form of a commonly known three-phase full wave bridge type rectifier circuit.
Figure 3A:
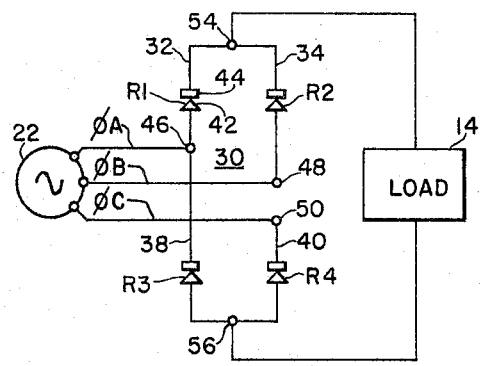
FIGS. 3A and 3B are respectively the diagram and the input and output wave forms of a rectifier circuit for converting three-phase A.C. to D.C. in accordance with the present invention.
Figure 1B:
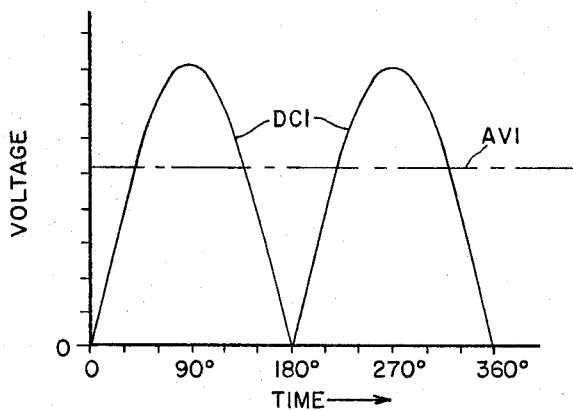
Figure 2B:
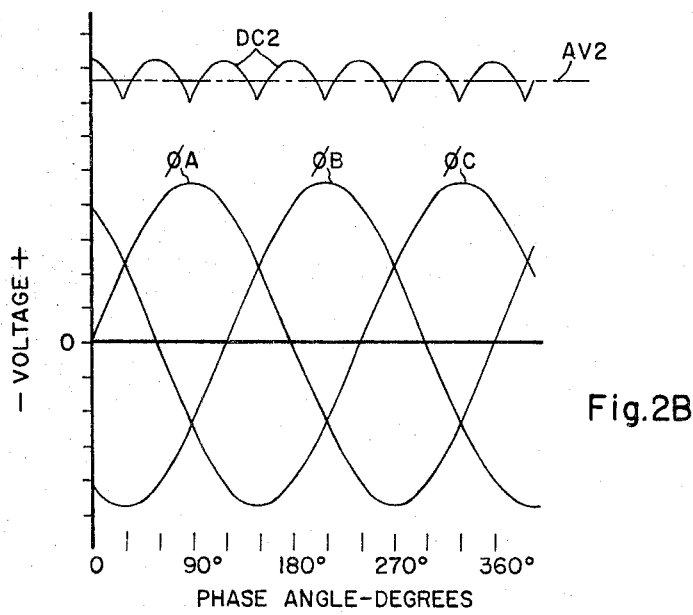
Figure 3B:
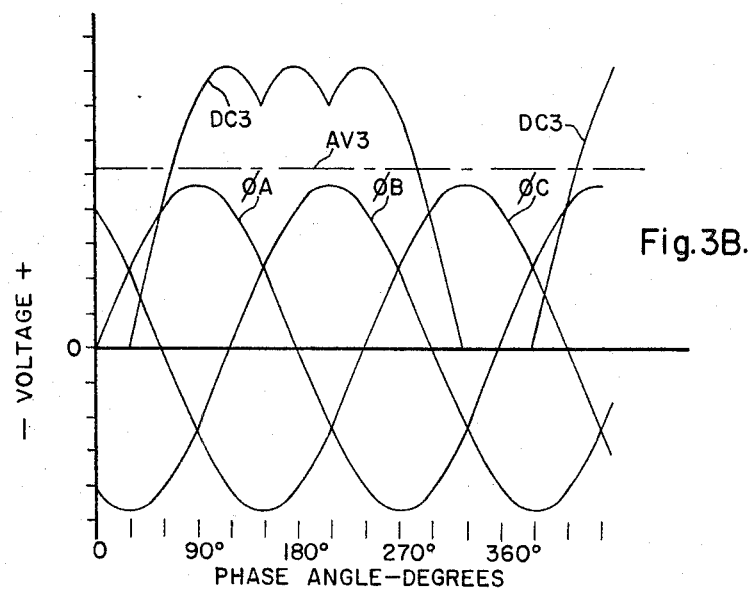

The wave forms shown in FIGS. 1B, 2B and 3B are for resistive or inductive loads.

The standard single-phase full wave rectifier bridge 10, shown in FIG. 1A, includes respective rectifier elements R1, R2, R3 and R4.

The A.C. input terminals of bridge 10 are connected to a single-phase A.C. source 12, and the D.C. output terminals are connected across a D.C. load 14. The D.C. output wave form of bridge 10 with resistive load is shown at DC1 in FIG. 1B. The time base is that of a cycle of input A.C. supplied to the input of the bridge. The curve AV1 represents the average D.C. output voltage of the bridge.

The standard three-phase full wave rectifier bridge 20 in FIG. 2A includes respective rectifier elements R1, R2, R3, R4, R5 and R6. The A.C. input terminals of the bridge are connected to a source 22 of three-phase A.C. and the D.C. output terminals are connected across a load 14. The input and output wave forms of the bridge 20 are shown in FIG. 2B wherein the curves for the respective phases of the input A.C. are identified by the corresponding phase symbol, and the D.C. output voltage wave for resistive load is indicated at DC2. Average D.C. output voltage is represented by the dashed line curve AV2.

It will be noted from FIGS. 1B and 2B that the proportion of the average voltage of the D.C. output to the peak voltage of the D.C. output for the three-phase bridge of FIG. 2A is much greater than that for the single-phase bridge of FIG. 1A. For the same line-to-line A.C. R.M.S. input voltage the three-phase bridge of FIG. 2A provides about a 50% higher average D.C. output voltage than the single-phase bridge of FIG. 1A.

The present invention is incorporated in the circuit shown in FIG. 3A wherein a modified three-phase bridge 30 includes four unidirectional current conduction arms 32, 34, 38 and 40. Each arm includes a rectifier, thus allowing current to flow through the arm in one direction only. The respective rectifiers are indicated at R1, R2, R3 and R4. The rectifiers may be unidirectional current devices of any suitable type, for example, gas or vacuum tube rectifiers, solid state rectifiers, etc. In a particular operating example of the circuit of FIG. 3A, each rectifier was a stack of selenium rectifier cells.

Since each rectifier is unidirectional, it has a load current inlet terminal and a load current outlet terminal, often referred to as anode and cathode, respectively, in the rectifier art. Thus when positive voltage is applied to its inlet terminal, the rectifier permits current to flow from its inlet terminal to its outlet terminal. Referring to rectifier R1, its inlet terminal is indicated at 42 while its outlet terminal is shown at 44. The same convention is applied to the other rectifiers in the circuit.

The bridge 30 has a three-phase A.C. input circuit including input terminals 46, 48 and 50 connected to the respective phases of a source 22 of three-phase A.C. The phases are represented by phase lines $\phi A$, $\phi B$ and $\phi C$. Bridge 30 also is provided with a D.C. output circuit including output terminals 54 and 56 which are shown connected across a load 14.

Arm 32 is connected between input terminal 46 and output terminal 54; arm 34 is connected between input terminal 48 and output terminal 54, arm 38 is connected between input terminal 46 and output terminal 56; and arm 40 is connected between input terminal 50 and output terminal 56. More specifically, the current outlet terminals 44 of rectifiers R1 and R2 are connected to output terminal 54; the current inlet terminals 42 of rectifiers R3 and R4 are connected to output terminal 56; the inlet terminal of rectifier R1 and the outlet terminal of rectifier R3 are connected to input terminal 46; the inlet terminal of rectifier R2 is connected to input terminal 48; and the outlet terminal of rectifier R4 is connected to input terminal 50.

The applied A.C. and the D.C. output (for resistive load) wave forms of bridge 30 are illustrated in FIG. 3B, wherein the applied A.C. voltage wave forms are marked with the corresponding phase designations $\phi A$, $\phi B$ and $\phi C$. The D.C. output voltage wave form is for resistive load and is indicated at DC3, while the average voltage of the D.C. output is represented by the dashed line curve AV3.

It will be noted that the curve DC3 is a scalloped curve having three peaks, one extending from 30° to 150°, the next from 150° to 210°, the third peak from 210° to 330°. For each cycle, the wave DC3 extends or has a base of 300°. Thus the D.C. output voltage wave is a series of uniformly spaced pulses, each 300° long and having a repetition rate corresponding with the input A.C. frequency. The portion of the curve DC3 extending from 30° to 150° represents conduction from phase A ($\phi A$) to phase C ($\phi C$) through rectifiers R1 and R4. The portion of curve DC3 between 150° and 210° is produced by conduction from phase B ($\phi B$) and to phase C ($\phi C$) through rectifiers R2 and R4, while the portion of this curve from 210° to 330° is a result of conduction from phase B ($\phi B$) to phase A ($\phi A$) through rectifiers R2 and R3.

From a comparison of the curves in FIGS. 1B and 3B it will be noted that the proportion of average to peak D.C. output voltages is approximately the same for the circuit of FIG. 3A as it is for the circuit of FIG. 1A. Actual tests were performed employing the same rectifier elements and resistive load connected first in the single-phase full wave bridge circuit configuration of FIG. 1A, and then in the circuit configuration of the present invention in FIG. 3A. With 115 volts R.M.S. supplied from the A.C. source 12 to the input of the bridge 10 in FIG. 1A, the D.C. average output voltage was 94 volts. With the same rectifier elements and load connected in the configuration of FIG. 3A, and with 115 volts R.M.S., line-to-line (phase-to-phase), supplied by the source 22 to the input of the bridge 30, the D.C. average output voltage across terminals 54 and 56 was 94 volts. With similar rectifiers and load connected in the three-phase full wave bridge configuration of FIG. 2A, test produced an average output D.C. voltage of 142 volts when 115 volts R.M.S. line-to-line was applied to the input of the bridge 20 by the three-phase source 22. With perfect (ideal) rectifiers and resistive load the calculated theoretical average D.C. output voltage values for the circuits of FIGS. 1A, 2A and 3A are as follows: FIG. 1A, 103.8 volts; FIG. 2A, 155.5 volts; and FIG. 3A, 103.8 volts. The peak output voltage for each is 163 volts.

The curves in FIGS. 1B, 2B and 3B are substantially representative for the general case. They are drawn to the same voltage scales, and represent comparative operation of the respective rectifier circuits of FIGS. 1A, 2A and 3A, all having similar rectifiers and load, and each supplied with the same value of R.M.S. input voltage, either single-phase or three-phase as the case may be. The area under the D.C. output wave per input A.C. cycle is the same for FIGS. 1B and 3B for a given value of A.C. R.M.S. input voltage.

It was found that the circuit of FIG. 3A draws nearly balanced three-phase A.C. currents, thus imposing a nearly balanced load on the power supply. This is important if transformers are interposed between the A.C. source and the rectifier bridge 30, in that it allows the transformers to be of minimum size and to provide a balanced three-phase output voltage.

Although the output wave forms for capacitive load would not be the same as those for resistive or inductive loads, the present invention may be practiced equally well with capacitive loads as well as resistive and inductive loads. With the same capacitive loads, circuits of FIG. 1A and FIG. 3A will give the same average output voltage.

With respect to the circuit of the invention shown in FIG. 3A, the connections from phase line $\phi B$ and $\phi C$ to input terminals 48 and 50 may be interchanged, and still provide the same value of average D.C. output voltage for a given A.C. input voltage. Similarly, phase lead $\phi A$ may be interchanged with lead $\phi B$ or $\phi C$ at the source 22 for the same results.

Figure 4:
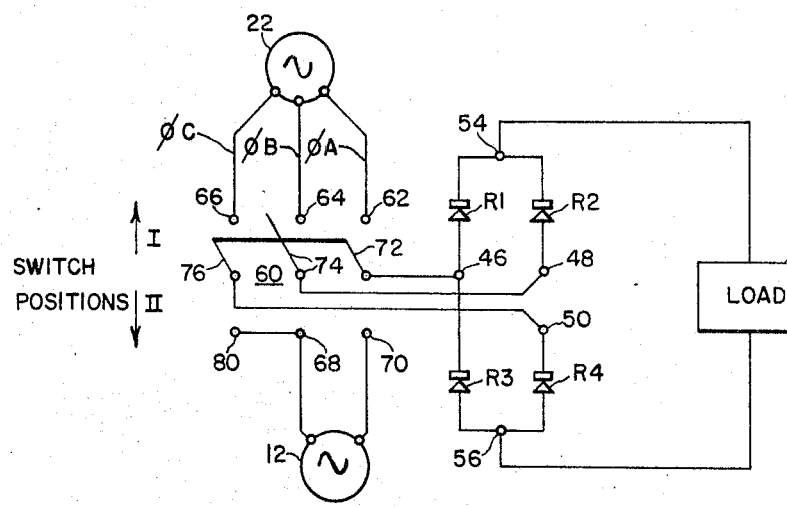
FIG. 4 is a diagram of a rectifier circuit embodying features of the invention and operable with single-phase or three-phase A.C. input.

While the rectifier circuit of the present invention shown in FIG. 3A has independent utility, the principle of the invention may be used in a dual mode circuit operable with either single-phase or three-phase input to provide the same average D.C. output. Such a circuit, in accordance with the present invention, is shown in FIG. 4. In this circuit rectifier elements R1, R2, R3 and R4 are selectively or alternatively connected either in the configuration of FIG. 1A or in the configuration of FIG. 3A by suitable means, for example the three pole, double throw switch 60. For either configuration, the power current outlet terminals of rectifiers R1 and R2 are connected to D.C. output terminal 54, and the power current inlet terminals of rectifiers R3 and R4 are connected to the D.C. output terminal 56, the terminals 54 and 56 being connected across a D.C. load 14.

The circuit of FIG. 4 has respective single-phase and three-phase A.C. input circuits. The three-phase input circuit includes terminals 62, 64 and 66 of the switch 60, respectively connected to phases $\phi A$, $\phi B$ and $\phi C$, of the three-phase source 22. The single-phase input circuit includes terminals 68 and 70 of switch 60, respectively, connected to opposite sides of the single-phase A.C. source 12. Switch 60 is provided with three poles 72, 74 and 76. The three-phase position of switch 60 is indicated as position I, while the single-phase position of the switch is indicated as position II.

In position I of switch 60, poles 72, 74 and 76 are in contact with terminals 62, 64 and 66, respectively, thus establishing the circuit configuration of FIG. 3A. More specifically, with switch 60 in position I, the current inlet terminal of rectifier R1 and the current outlet terminal of rectifier R3 are connected to phase line $\phi A$ of source 22; the inlet terminal of rectifier R2 is connected to phase line $\phi B$ of the source 22; and the outlet terminal of rectifier R4 is connected to phase line $\phi C$ of source 22.

When switch 60 is moved to position II, poles 76, 74 and 72 are in contact with switch terminals 80, 68 and 70, respectively. Terminals 68 and 80 are connected together. In position II, switch 60 establishes the circuit configuration of FIG. 1A. More specifically, switch poles 76 and 74 connect the current inlet electrode of rectifier R2 and the current outlet electrode of rectifier R4 to one side of the single-phase A.C. source 12, while switch pole 72 connects the inlet electrode of rectifier R1 and the outlet electrode of rectifier R3 to the opposite side of the source 12. Although the invention is not restricted thereto, the A.C. sources 12 and 22 may have the same magnitude of line-to-line R.M.S. voltage, thus providing the load 14 with substantially the same average D.C. output voltage from the rectifier circuit energized by either the three-phase source or the single-phase source, depending upon the position of switch 60.

From the description herein it should be apparent that the invention makes possible a novel three-phase rectifier circuit configuration which employs four rectifier arms, and for a given value of input voltage provides approximately the same D.C. average output voltage as a single-phase bridge rectifier circuit the same number of rectifier arms.

It should be understood that a rectifier element in a rectifier arm may be a single rectifier unit or a plurality of rectifier units in any desirable connection in the arm. For example, a plurality of units may be either in parallel in the arm for high current capacity or in series in the arm for high voltage rating, or in combination of both.

It is to be understood that the herein described arrangements are simply illustrative of the principles of the invention, and that other embodiments and applications are within the spirit and scope of the invention.

I claim as my invention:

1. Apparatus for converting A.C. to D.C. comprising a three-phase A.C. input circuit having first, second and third input means for connection to the respective phases of a three-phase A.C. source, a single-phase A.C. input circuit having first and second input means for connection to opposite sides of a single-phase A.C. source, first and second D.C. output means of opposite polarity, respective unidirectional circuit arms A, B, C and D, each operable to pass current from a particular end of the arm to the other end of the arm, said particular ends of arms A and B being connected to one of said D.C. output means, said other ends of arms C and D being connected to the other D.C. output means, and means for selectively connecting said input means to the remaining ends of said arms in either of two circuit configurations, in one of said configurations said particular end of arm C and said other end of arm A being connected to one of said three-phase input means, said particular end of arm D being connected to another of said three-phase means and said other end of arm B being connected to the remaining three-phase input means, and in the other of said configurations said particular end of arm C and said other end of arm A being connected to one of said single-phase input means, and said particular end of arm D and said other end of arm B being connected to the other single-phase input means.

2. Apparatus for converting A.C. to D.C. comprising a source of three-phase A.C., a source of single-phase A.C., first and second D.C. output means of opposite polarity, respective rectifier elements A, B, C and D, each having respective current inlet and outlet means, said inlet means of elements A and B being connected to one of said D.C. output means, said outlet means of elements C and D being connected to the other D.C. output means, and means for selectively connecting said input means to the remaining ends of said arms in either of two circuit configurations, in one of said configurations said inlet means of element C and said outlet means of element A being connected to one phase of said three-phase source, said inlet means of element D being connected to another phase of said three-phase source and said outlet means of element B being connected to the remaining phase of said three-phase source, and in the other of said configurations said inlet means of element C and said outlet means of element A being connected to one side of said single-phase source, and said inlet means of element D and said outlet means of element B being connected to the other side of said single-phase source.

3. Apparatus for converting A.C. to D.C. comprising a three-phase A.C. input circuit having first, second and third input means for connection to the respective phases of a three-phase A.C. source, a single-phase A.C. input circuit having first and second input means for connection to opposite sides of a single-phase A.C. source, respective unidirectional current elements A, B, C and D, each element having respective current inlet and outlet means, means for connecting said outlet means of elements A and B together to form a D.C. output junction of one polarity, means for connecting said inlet means of elements C and D together to form a D.C. output junction of the opposite polarity, first connecting means for alternatively connecting said inlet means of element A and said outlet means of element C either to one of said three-phase input means or to one of said single-phase input means, second connecting means for alternatively connecting said inlet means of element B either to another of said three-phase input means or to the other of said single-phase input means, and third connecting means for alternatively connecting said outlet means of element D either to the remaining three-phase input means or to said other single-phase input means, and means for operating said first, second and third connecting means in unison to alternatively provide either three-phase or single-phase modes of operation.

4. Apparatus for converting A.C. to D.C. comprising a source of three-phase A.C., a source of single-phase A.C., respective rectifier elements A, B, C and D, each rectifier element having respective current inlet and outlet means, means for connecting said outlet means of elements A and B together to form a D.C. output junction of one polarity, means for connecting said inlet means of elements C and D together to form a D.C. output junction of the opposite polarity, first connecting means for alternatively connecting said inlet means of element A and said outlet means of element C either to one phase of said three-phase source or to one side of said single-phase source, second connecting means for alternatively connecting said inlet means of element B either to another phase of said three-phase source or to the other side of said single-phase source, and third connecting means for alternatively connecting said outlet means of element D either to the remaining phase of said three-phase source or to said other side of said single-phase source, and means for operating said first, second and third connecting means in unison to alternatively provide either three-phase or single-phase modes of operation.

5. A three-phase A.C. to D.C. rectifier bridge having only four unidirectional circuit arms A, B, C and D, each operable to pass current from a particular end of the arm to the other end of the arm, said bridge further comprising a three-phase A.C. input circuit having first, second and third input means for connection to the respective phases of a three-phase A.C. source, a pair of D.C. output terminals for connection to a load, said particular ends of arms A and B being connected to one of said D.C. terminals, said other ends of arms C and D being connected to the other D.C. terminal, one of said input means being connected to said particular end of arm C and to said other end of arm A, another of said input means being connected to said other end of arm B and to no other arm, and the remaining input means being connected to said particular end of arm D and to no other arm.

6. Apparatus for converting three-phase A.C. to D.C., said apparatus comprising a source of three-phase A.C. having three output phase lines, a three-phase A.C.–D.C. rectifier bridge having only four respective rectifier elements A, B, C and D, each having respective current inlet and outlet terminals, a pair of D.C. output terminals for connection to a load, said inlet terminals of rectifier elements A and B being connected to one of said D.C. terminals, said outlet terminals of rectifier elements C and D being connected to the other D.C. terminal, one of said phase lines being connected to said inlet terminal of rectifier element C and to said outlet terminal of rectifier element A, another of said phase lines being connected to said outlet terminal of rectifier element B and to no other rectifier element, and the remaining phase line being connected to said inlet terminal of rectifier element D and to no other rectifier element.

References Cited by the Examiner

UNITED STATES PATENTS

| | | | |
|---|---|---|---|
| 2,444,458 | 7/1948 | Master | 321—8 |
| 3,009,091 | 11/1961 | Hallidy | 322—28 |

JOHN F. COUCH, *Primary Examiner.*

LLOYD McCOLLUM, *Examiner.*

W. H. BEHA, *Assistant Examiner.*